US011507965B2

(12) United States Patent
Schimmelmann et al.

(10) Patent No.: US 11,507,965 B2
(45) Date of Patent: Nov. 22, 2022

(54) TIRE INVENTORY DECISION SUPPORT SYSTEM

(71) Applicant: Bridgestone Americas Tire Operations, LLC, Nashville, TN (US)

(72) Inventors: Kevin Schimmelmann, Atlanta, GA (US); Andrej Levin, Eckernfoerde (DE); Christopher B. Tavares, Franklin, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 16/493,032

(22) PCT Filed: Mar. 7, 2018

(86) PCT No.: PCT/US2018/021285
§ 371 (c)(1),
(2) Date: Sep. 11, 2019

(87) PCT Pub. No.: WO2018/169739
PCT Pub. Date: Sep. 20, 2018

(65) Prior Publication Data
US 2020/0013078 A1    Jan. 9, 2020

Related U.S. Application Data

(60) Provisional application No. 62/471,156, filed on Mar. 14, 2017.

(51) Int. Cl.
*G06Q 10/06* (2012.01)
*G06Q 30/02* (2012.01)
*G06Q 10/08* (2012.01)

(52) U.S. Cl.
CPC ....... *G06Q 30/0204* (2013.01); *G06Q 10/087* (2013.01); *G06Q 30/0201* (2013.01)

(58) Field of Classification Search
CPC .. G06Q 30/0204; G06Q 10/087; G06Q 30/02; G06Q 20/18; G06Q 30/0201; G06F 17/60; G06F 9/451; B60C 99/00
(Continued)

(56) References Cited

U.S. PATENT DOCUMENTS 5,765,143 A * 6/1998 Sheldon ............... G06Q 20/203
705/28
6,567,824 B2   5/2003 Fox
(Continued)

FOREIGN PATENT DOCUMENTS

JP    2003176029 A    6/2003
JP    2005251108 A    9/2005

OTHER PUBLICATIONS

Ugarte, Gustavo M., Jay S. Golden, and Kevin J. Dooley. "Lean versus green: The impact of lean logistics on greenhouse gas emissions in consumer goods supply chains." Journal of Purchasing and Supply Management 22.2 (2016): 98-109. (Year: 2016).*

(Continued)

*Primary Examiner* — Charles Guiliano
*Assistant Examiner* — Thea Labogin
(74) *Attorney, Agent, or Firm* — Shaun J. Fox; Gary L. Montle

(57) ABSTRACT

A tire inventory decision support system (100) optimizes tire allocations across a plurality of trade areas for local tire dealers, as well as regional trade areas for tire repositories as regional fulfillment hubs. The system defines trade areas having demographic tire demand characteristics and corresponding to an available inventory population for respective dealers. For each trade area, optimal dealer inventory populations are projected for tire sizes and brands, based in part on the available inventory population for the dealer an actual inventory population for the associated tire repository. The (Continued)

system compares the optimal inventory population for each dealer to actual inventory population, and selectively generates dealer interfaces displaying recommendations for tire inventory modification based on value propositions as disparities between the optimal and actual inventory populations. The system may further identify value propositions for inventory reallocation by regional hubs themselves, based on aggregated inventory for associated dealers.

11 Claims, 8 Drawing Sheets

(58) Field of Classification Search
USPC .................................................... 705/7.34
See application file for complete search history.

(56) References Cited

U.S. PATENT DOCUMENTS

| | | | |
|---|---|---|---|
| 7,480,623 | B1 | 1/2009 | Landvater |
| 7,552,066 | B1 | 6/2009 | Landvater |
| 7,827,053 | B2 * | 11/2010 | Kalnicki ............ G06Q 30/0204 |
| | | | 705/7.33 |
| 8,019,656 | B2 | 9/2011 | Baran et al. |
| 8,112,318 | B2 | 2/2012 | Kirian et al. |
| 8,180,664 | B2 | 5/2012 | Shan |
| 8,239,292 | B2 | 8/2012 | Drazan et al. |
| 8,380,580 | B2 | 2/2013 | Kirian et al. |
| 8,589,212 | B2 | 11/2013 | Pollak et al. |
| 8,719,072 | B2 | 5/2014 | Mueller |
| 2002/0174019 | A1 | 11/2002 | Henderson et al. |
| 2003/0208394 | A1 | 11/2003 | Burris et al. |
| 2004/0148217 | A1 | 7/2004 | Lauring et al. |
| 2005/0075949 | A1 | 4/2005 | Uhrig et al. |
| 2005/0278225 | A1 | 12/2005 | Santa-Rosa |
| 2005/0288989 | A1 | 12/2005 | Kim et al. |
| 2005/0288993 | A1 | 12/2005 | Weng et al. |
| 2007/0129989 | A1 | 6/2007 | Ponton et al. |
| 2007/0156510 | A1 | 7/2007 | Kim et al. |
| 2008/0065516 | A1 * | 3/2008 | Raju ................... G06Q 10/087 |
| | | | 705/28 |
| 2008/0133331 | A1 | 6/2008 | Kim et al. |
| 2009/0259509 | A1 | 10/2009 | Landvater |
| 2013/0151381 | A1 | 6/2013 | Klein |
| 2013/0204725 | A1 * | 8/2013 | Damon .............. B29D 30/0005 |
| | | | 705/20 |
| 2014/0052566 | A1 | 2/2014 | Neidert et al. |
| 2014/0214634 | A1 | 7/2014 | Hearty |
| 2017/0046765 | A1 | 2/2017 | Dreyer et al. |

OTHER PUBLICATIONS

Sanjay L. Ahire, John B. Jensen Snider Tire Optimizes Its Customers-Stores-Plants Transportation Network. INFORMS Journal on Applied Analytics 47 (2) 150-162 https://doi.org/10.1287/inte.2016.0876 (Year: 2017).*

PCT International Search Report dated Jun. 15, 2018 for International Application No. PCT/US2018/021285 filed Mar. 7, 2018.

* cited by examiner

500

| Car Value and Age | | | Tier Mix Matrix | Recommendation Alignment | | |
|---|---|---|---|---|---|---|
| High Value | Low Value | Mixed Value | | High | Medium | Low |
| ▲ | ▼ | ● | | ✓ | ✱ | ✗ |

Tire Size Opportunity ◆

| Rank | Tire Size | Top Speed Rating | Car Value and Age | A | B | C |
|---|---|---|---|---|---|---|
| 1 | 215/60R16 | 94V | ● | 65% ✱ | 28% ✱ | 6% ✓ |
| 2 | 205/55R16 | 89H | ▲ | 70% ✱ | 23% ✱ | 7% ✓ |
| 3 | 195/65R15 | 89S | ● | 48% ✱ | 33% ✗ | 19% ✓ |
| 4 | 215/55R17 | 93V | ▲ | 89% ✱ | 11% ✓ | - ✱ |
| 5 ◆ | 225/60R16 | 97S | ▼ | 11% ✓ | 56% ✓ | 32% ✓ |
| 6 ◆ | 205/65R15 | 92H | ● | 14% ✓ | 46% ✗ | 41% ✗ |
| 7 | 265/70R17 | 113S | ● | 71% ✗ | 26% ✗ | 3% ✓ |
| 8 | 235/70R16 | 104S | ● | 44% ✱ | 48% ✱ | 7% ✓ |
| 9 | 225/50R17 | 93V | ▲ | 85% ✗ | 14% ✓ | 1% ✱ |
| 10 | 245/75R16 | 116R | ● | 46% ✗ | 23% ✗ | 31% ✗ |
| 11 | 225/65R17 | 102T | ▲ | 100% ✗ | 0% ✗ | - ✓ |

*FIG. 5* ical inventory. The tire retail industry in its present form maintains a low level of inventory analytics and optimization. Inventory decisions are predominantly made on the basis of rearward-facing historical sales analysis, rather than progressive and predictive functionality. As a result, a significant minority of tire sales are for tires which must be filled-in because they are not in stock. This causes a heavy reliance on distribution centers for just-in-time delivery, which further increases costs to the bottom line of retailers, even to the extent that the sale is not lost altogether because the desired item is not in stock when the consumer is ready to buy.

TIRE INVENTORY DECISION SUPPORT SYSTEM

TECHNICAL FIELD

The present invention relates generally to inventory decision support for product retailers based on projected demand. More particularly, the present invention relates to a distributed network of tire retailers and inventory decision support methods to account for demand characteristics in a given trade area for each retailer. Certain embodiments of an invention as disclosed herein relate to a distributed network of tire retailers associated with a tire repository or hub, and methods to forecast and reallocate tires to be maintained in the tire repository based on demand characteristics in respective trade areas with respect to actual inventory for each associated retailer.

BACKGROUND ART

The tire retail industry in its present form maintains a low level of inventory analytics and optimization. Inventory decisions are predominantly made on the basis of rearward-facing historical sales analysis, rather than progressive and predictive functionality. As a result, a significant minority of tire sales are for tires which must be filled-in because they are not in stock. This causes a heavy reliance on distribution centers for just-in-time delivery, which further increases costs to the bottom line of retailers, even to the extent that the sale is not lost altogether because the desired item is not in stock when the consumer is ready to buy.

Tire retailers further typically maintain a proliferation of SKU's in their tire inventory, leading not only reduced inventory in the faster moving products but to higher complexity in product offerings to consumers and inventory replenishment decisions.

It would therefore be desirable to provide predictive allocation and reallocation of inventory among points of sale and regional hubs in a retail network, essentially maintaining a requisite level of local inventory for the most popular SKUs while further delivering slower selling but nonetheless valuable product offerings to regional hubs proximate to the customers most likely to purchase them.

It would further be desirable to allocate and reallocate inventory among a tire retail network in a manner so as to minimize special orders, improve real-time fulfillment logistics for such special orders when needed, and reduce channel conflicts.

DISCLOSURE OF THE INVENTION

Decision support systems and methods as disclosed herein may generally reduce complexity in inventory optimization at a point of sale level. By mapping demand characteristics associated with a tire dealer to a portfolio of available tire sizes and brands, the tire dealer can effectively identify value propositions for allocation and reallocation of inventory. Embodiments of decision support systems and methods as disclosed herein may further optimize inventory allocation and reallocation at a regional level, based upon micro-analysis of the underlying points of sale and an aggregation of their respective demand characteristics relative to actual inventories on hand.

Briefly stated, systems and methods as disclosed herein aim to ensure that local points of sale and regional hubs have an appropriate portfolio of products in stock, based on an improved recognition of the respective demand for such products. In an embodiment, a system as disclosed herein may leverage socio-demographics around a point of sale to define which tire sizes, and which SKUs per tire size, should be stored and actively promoted by a respective tire dealer. Systems and methods as disclosed herein may further translate overall priorities for dealers into an individualized inventory recommendation, for example in units by SKU.

One particular embodiment of a tire inventory decision support system as disclosed herein optimizes tire allocations across a plurality of trade areas for local tire dealers, as well as regional trade areas for tire repositories as regional fulfillment hubs. The system defines trade areas having demographic tire demand characteristics and corresponding to an available inventory population for respective dealers. For each trade area, optimal dealer inventory populations are projected for tire sizes and brands, based in part on the available inventory population for the dealer and in some embodiments on an actual inventory population for the associated tire repository. The system compares the optimal inventory population for each dealer to actual inventory population, and selectively generates dealer interfaces displaying recommendations for tire inventory modification based on value propositions as disparities between the optimal and actual inventory populations.

The system may further identify value propositions for inventory reallocation by regional hubs themselves, based on aggregated demand characteristics for underlying trade areas, and in certain embodiments further based on actual inventory for associated dealers.

The system may still further enable enhanced demand forecasting at a centralized level, wherein allocation of tires may be streamlined across a distribution network of dealers and hubs, without (or otherwise minimizing) the need for distribution centers between the manufacturing facility and the respective dealers and hubs.

BRIEF DESCRIPTION OF THE DRAWINGS

FIG. 5 is a screen shot rendering for an exemplary tire dealer user interface generated by a system as disclosed herein.

BEST MODE FOR CARRYING OUT THE INVENTION

Figure 1:
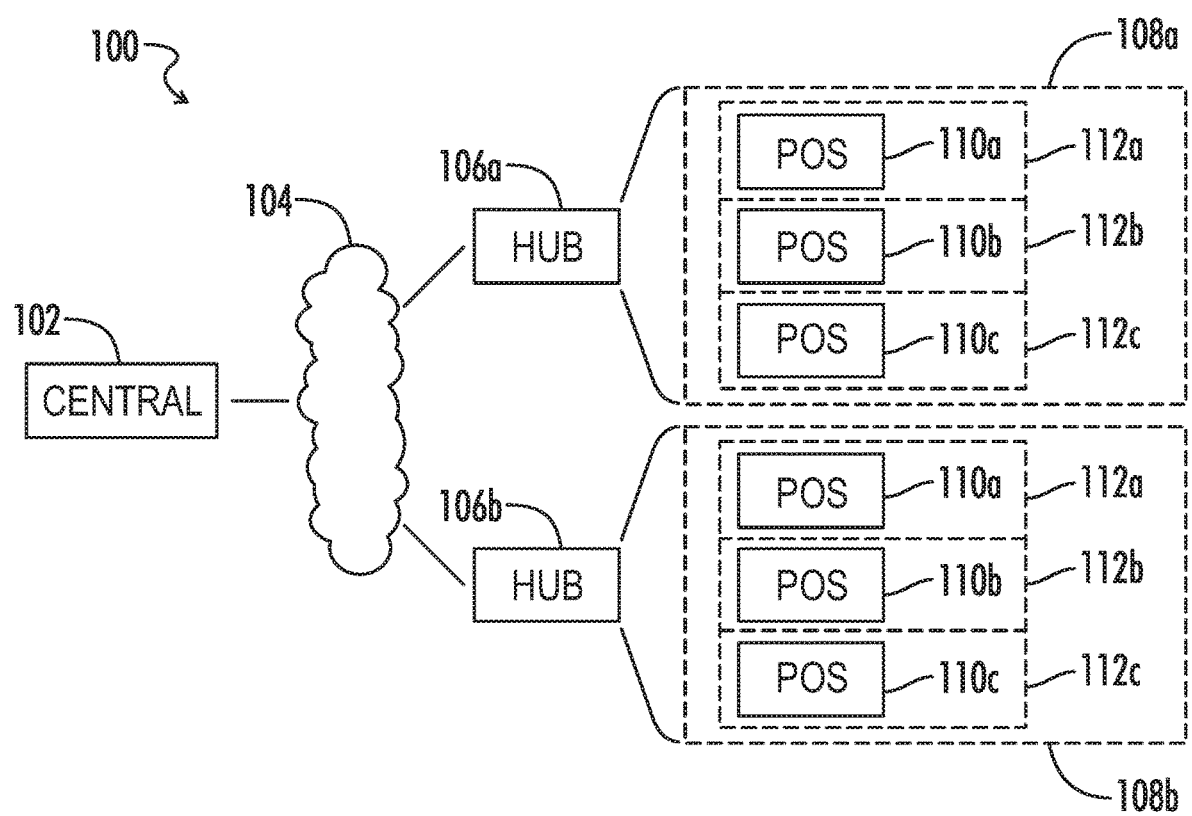
FIG. 1 is a block diagram representing an embodiment of a tire inventory decision support system as disclosed herein.

Referring generally to FIGS. 1-10, various exemplary embodiments of an invention may now be described in detail. Where the various figures may describe embodiments sharing various common elements and features with other embodiments, similar elements and features are given the same reference numerals and redundant description thereof may be omitted below.

By initial reference to FIG. 1, an embodiment of an inventory decision support system 100 as disclosed herein may be provided with respect to a central server or decision support system 102, regional hubs 106a, 106b associated with respective trade areas 108a, 108b and a plurality of point of sale (POS) 110x associated with a regional hub and with respective trade areas 112x. In various embodiments, methods and processes as disclosed herein are executable by the central server but in alternative embodiments may be executed from computing devices or networks associated with any one or more of the hubs or POS's in an individual capacity. In an embodiment, services associated with execution of a method as disclosed herein, such as for example targeted analysis, data processing and report generation may be remotely performed by a hosted server wherein results are downloaded or streamed for display on a computing device or associated display unit for a respective hub or POS.

Embodiments of an invention as disclosed herein may refer particularly to inventory of tires in a retail context. The regional hubs 106 in such embodiments may further be referred to herein as a "tire repository" or "tire warehouse" without being explicitly limited thereto. For example, a hub may serve as a tire repository for fulfillment purposes with respect to various POS nodes in a distribution network, while still in some cases maintaining a storefront for direct fulfillment, either physically (i.e., brick and mortar) or via an online presence. The POS 110 may in various embodiments be referred to herein as a "tire dealer", and preferably a tire dealer having a brick-and-mortar storefront but not exclusively limited to such unless otherwise stated.

In certain embodiments, methods as disclosed herein may be centrally executed based upon central direction or otherwise upon remote request from a user such as for example associated with a local point of sale or regional hub. In certain embodiments, a user computer device associated with a local point of sale or regional hub may be communicatively connected through a communications network to an inventory database. In said embodiments, the user computer device may be configured to perform inventory and order management and adjustment whereby a user can, through the device's interface, monitor and selectively adjust stock quantity, inventory, price, cost, SKUs, and other retail- or service-oriented information. The interface may further present decision support tools based on optimal inventory portfolios according to the present disclosure, with value propositions recommended or otherwise highlighted on the display based on comparisons of the demand-based inventory against an actual inventory portfolio.

In certain embodiments, a customer may be able to request tire dealer inventory information via a customer mobile device (not shown) communicatively connected to the server via the communications network. The customer may be enabled to identify one or more tires for potential ordering and purchase, with the interface further presenting tires that are available for purchase from the associated tire dealer. The available tires may in certain cases be only those tires that are physically present in inventory for the tire dealer, or may otherwise include tires that are available for fulfillment with respect to for example a regional hub, in a fulfillment time corresponding to an amount of time before the customer requires the identified tires. For example, the interface (as may be provided within the context of a hosted website or a mobile application executed from the customer device) may determine the customer location with respect to the tire dealer or otherwise request a desired pick-up time, and correspondingly calculate a fulfillment window of time for consideration with respect to nearby regional hubs or even distribution centers as needed. In an embodiment, a customer may request to receive a notification on the customer mobile device upon the completion of tire fulfillment services associated with a customer order (i.e., delivery from a regional hub to a selected tire dealer) via a communications protocol such as, for example, text message, push notification, or e-mail.

Figure 2:
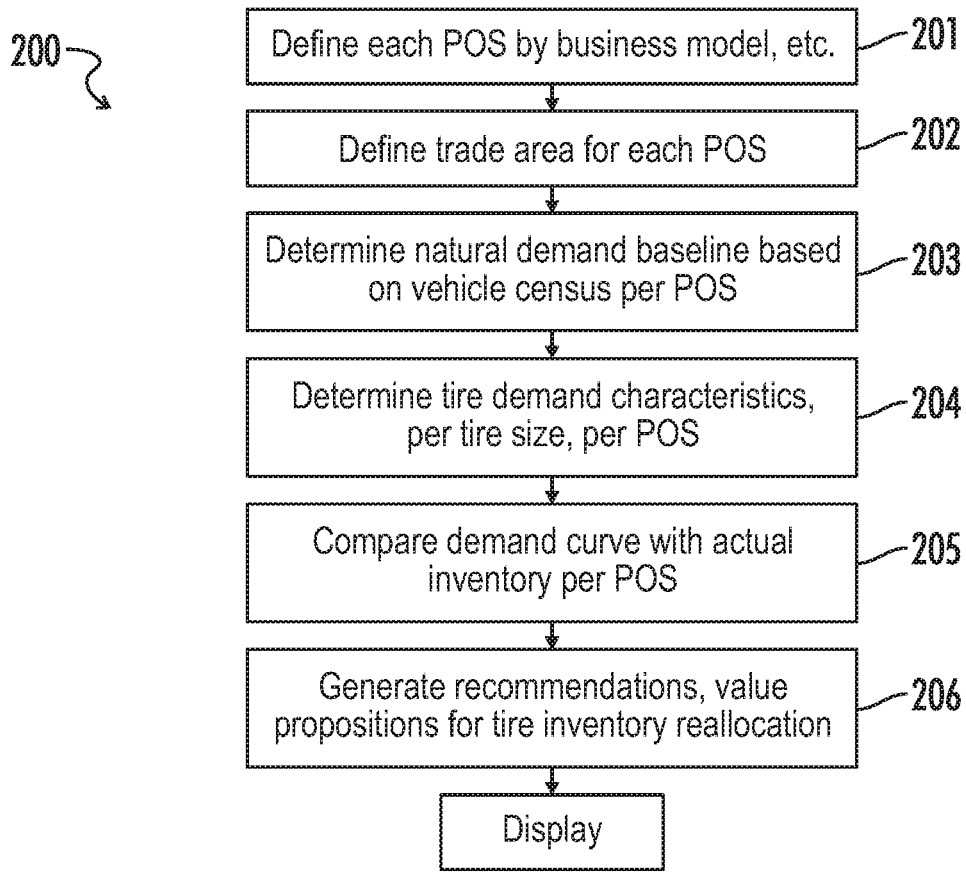
FIG. 2 is a flowchart representing an embodiment of a process for tire dealer inventory optimization as disclosed herein.

Referring next to FIG. 2, an embodiment may now be described for a tire inventory decision support method 200 with respect to an individual dealer, or alternatively stated a method that may be independently performed for each of a plurality of dealers with respect to like products (i.e., tire sizes and brands).

A system as disclosed herein may (step 201) define a respective POS in terms of its business model. For example, one or more subsequent steps may rely in part on a determination as to the scope of the POS retail presence with respect to the goods or services at issue (i.e., tires), such as for example whether or not the POS is exclusively a tire dealer, or maintains tire retail as a proportion of an overall offering of goods and services, or carries a number of tire brands that are outside of the scope or competing with one or more brands associated with the host system.

A system as disclosed herein may further (step 202) define a trade area for each dealer. The trade area may be defined in part based on geopolitical or natural boundaries, particularly where for example national (and to progressively lesser extent, state or county) borders are involved, but more generally is defined based on commercial factors in order to assist in the calculation of tire demand criteria. The trade area may further be defined in accordance with the business model of the POS as previously noted-in other words, a larger POS (in terms of raw size in a particular location or perhaps as part of a national or multi-national chain) may often be defined as having a relatively large trade area due to increased traffic and inventory capabilities with respect to for example a much smaller POS.

Figure 3:
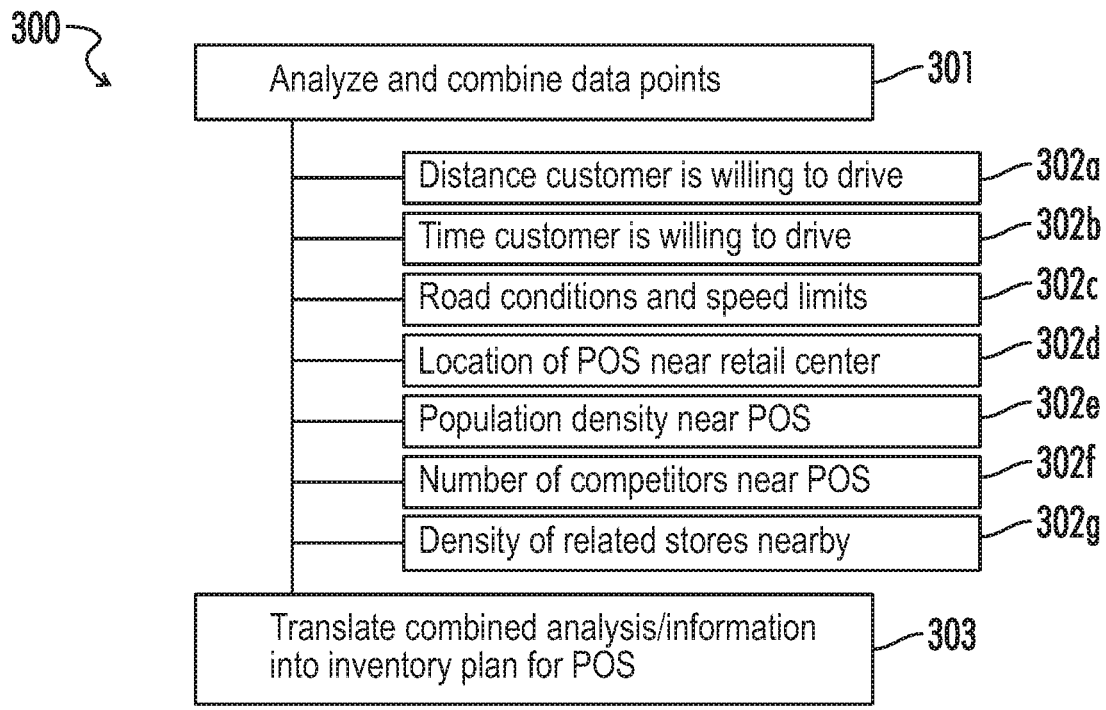
FIG. 3 is a flowchart representing an embodiment of a process for dealer trade area definition as disclosed herein.

A particular example of a process 300 for defining the trade area for a particular tire POS may be illustrated by reference to FIG. 3. The system generally may (step 301) analyze and combine a number of data points using program engine algorithms and as relevant to the tire dealer at issue. Exemplary data points may include, without limitation, values or scores pertaining to: a determined distance that customers are willing to drive to the POS (302a); a determined time that customers are willing to drive to the POS (302b); road conditions and speed limits proximate to the POS (302c); location of the POS relative to a retail center (302d); population density near the POS (302e); a number of competitors proximate to the POS (302f); a density of non-competing retail stores proximate to the POS (302g), and the like.

In an embodiment, the process may collect primary (or "raw") data from various available sources, such as for example may be directly obtained (e.g., a number of retailers in a geographic proximity) or as may be determined through polling or historical analytics (e.g., a distance that consumers are willing to drive), and further drive secondary (or "derivative") data based for example on correlations drawn from the raw data. One example of such derivative data may include predicting drive times for consumers within a trade area, as may be based on road conditions, traffic patterns and other demographic variables, and applying these predictions in view of a determined time that customers may be willing to drive to visit the point of sale. The resulting comparison of drive time elements may in some cases cause the trade area to be modified or otherwise be demarcated for predictive purposes among core or peripheral portions of the area, and may substantively affect demand characteristics for the tire portfolio as a whole where the demographics of a predicted consumer set are foreseeably different than would have otherwise been the case.

Examples of raw data may include point of sale data, socio-demographic data, consumer behavioral data and car park data, as collected or otherwise obtained from proprietary sources or publicly available sources which may include without limitation products and services offered by IHS Automotive, Experian, Edmunds, Brightline Solutions, Neustar, and the like.

A combination of such data points may accordingly be scored, weighted and aggregated to generate inputs for subsequent engines or decision support program blocks which further produce an inventory plan for the POS (step 303). Referring again to FIG. 2, the system may determine a natural demand baseline for new or replacement tires based on a vehicle census with respect to the defined trade area. The system may account for any of various demographic, commercial and historical parameters and data points as may be deemed relevant, but particularly for example a number of vehicles in the area, a value of such vehicles, known trends in tire replacement or vehicle purchases, etc. The system may primarily account for average values with respect to the above, or may "drill down" into the data to determine a range of values. For example, a tire demand baseline may be differently obtained for two trade areas, even where the average values are the same, if one area includes a relatively large number of families and vehicles at opposing ends of a defined spectrum, as opposed to a more reliable cluster of families and vehicles near the middle portion of the spectrum.

The system may further (step 204) determine a nominally demand-based or optimal weighting of tire inventory for a dealer in that trade area, based on tire demand characteristics at a more granular level, in other words with respect to particular tire sizes and tire brands, further based on the prior calculations. Determinations of tire demand at respective sizes may be made, as with the previous step (or indeed as part of a same step where the system engines or algorithms may be commonly employed) using commercial and demographic information associated with the trade area. Determinations with respect to "tire brands" may in some cases be reasonably made directly with respect to a particular brand, or may further or in the alternative be inferred with respect to other brands having similar cost, quality, source, etc. For example, the system may determine that tire demand is a certain level for Brand X offered by Company A, based in part on direct analysis (historical or otherwise) with respect to Brand X itself, but in various examples further based on indirect analysis of Brand Y offered by Company B as structurally and demographically similar, or further based on an analogous Brand Z as previously offered by Company A.

Figure 4:
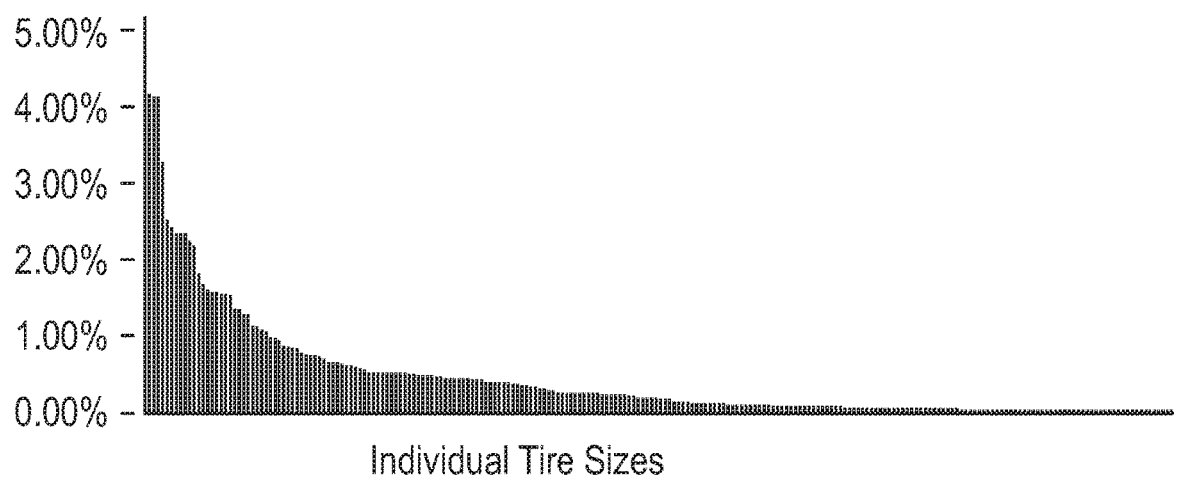
FIG. 4 is a graphical representation of an exemplary tire size distribution for a particular tire dealer.

The system may then (step 205) execute a comparison of the determined tire demand for a given area with respect to an actual inventory offered or held by the POS, and (step 206) generate any recommendations as pertinent based on value propositions for future allocation or reallocation of tire inventory. An exemplary tire size distribution is illustrated in FIG. 4, wherein an ordered list of tire sizes may be generated along the x-axis, and a percentage of the respective tire size with respect to all units is generated in the y-axis. Program engines may be implemented to project future sales for a tire dealer over a period of time based on the current tire inventory as informed by projected demand across the range of tire sizes and brands, market share, etc.

In an embodiment, respective curves may be generated on a user display relating to both of a demand curve and actual inventory curve for the same ordered list of tire sizes, wherein the user can self-analyze the curves for disparities.

In an embodiment, the system may further highlight specific tire sizes or brands where a value proposition is presented, based on a difference between the optimal and actual inventories exceeding a predetermined threshold deviation level. The threshold may be variable depending on criteria such as for example where the particular tire size or brand falls on the graph, or the relative cost of such tire brand. A present disparity may be less critical, for example, where the tires in stock are likely to sell in a reasonable amount of time, as opposed to overstocking of an item that is relatively unlikely to sell in the foreseeable future.

Referring to FIG. 5, a dealer interface 500 as generated by the system may further or in the alternative include a spreadsheet format, which in the example shown is ranking individual tire sizes from highest demand to lowest. Although not shown, additional columns may be provided showing the number of cars in the trade area associated with a given size, that number as a weighted percentage, the number of units sold by that dealer per tire size, etc. The displayed information may include indications as to tire size and age, highlighted with respect to high, low or mixed relative value. The displayed information may further relate to brands associated with that tire size, ordered with respect to a parameter such as for example commercial desirability (e.g., A="Best/Better"; B="Good"; C="Bad/competitor brand"), and highlighted with respect to a disparity between the actual inventory and the optimal inventory based on determined demand.

Figure 6:
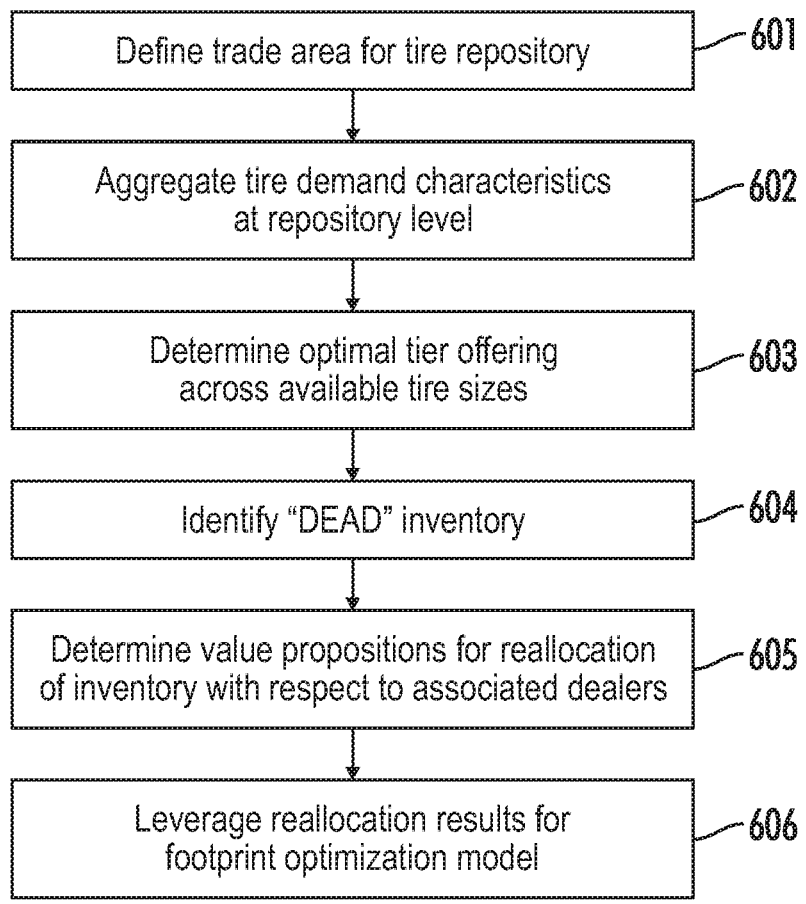
FIG. 6 is a flowchart representing an embodiment of a process for tire repository inventory optimization as disclosed herein.

Referring now to FIG. 6, an embodiment may now be described for a tire inventory decision support method 600 with respect to an individual tire repository, or alternatively stated a method that may be independently performed for each of a plurality of tire repositories with respect to their associated dealers of like products (i.e., tire sizes and brands).

A system as disclosed herein may (step 601) define a regional trade area for a tire repository, which in various embodiments may be similar in substance to an operation as described above at dealer level. The regional trade area may be defined in part based on geopolitical or natural boundaries, particularly where for example national (and to progressively lesser extent, state or county) borders are involved, but more generally is defined based on commercial factors in order to assist in the calculation of tire demand criteria.

Figure 7:
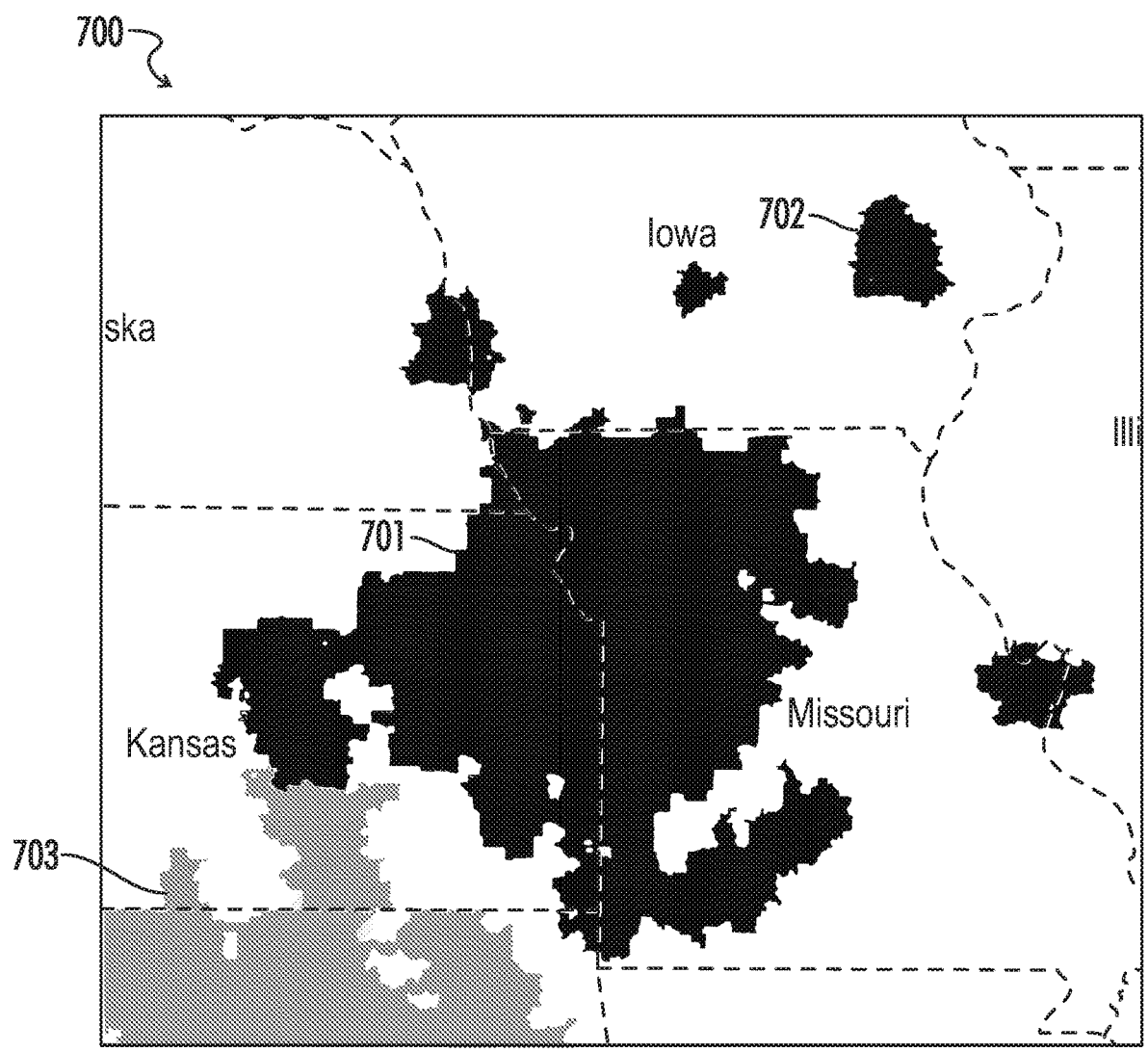
FIG. 7 is a graphical representation of an exemplary trade area generated for a tire repository by a system as disclosed herein.

For example, a tire repository trade area 700 as illustrated in FIG. 7 may include portions of a number of states as dictated by logistics and commercial realities specific to the area. A standard service area may be defined around repository locations, having a radius based for example on a two hour drive time to existing customer locations. In such an example, all zip codes within the two hour radius may be included in the trade area. In the example shown, a first portion 701 of the regional trade area 700 may in fact be separated entirely from one or more additional portions 702 that nonetheless share logistical synergies for the purpose of product allocation, replenishment and on-demand fulfillment, or for the purpose of otherwise capturing existing customers. A particular regional trade area may be defined with distinct contours with respect to proximate regional trade areas 703, or may in some cases have overlapping contours so as to define core or peripheral portions of respective regional trade areas (and as may be accounted for in weighting of trade area demographic data for their respective tire demand calculations), or may have gaps in between the defined regional trade areas that are flexibly accounted for by the system with respect to tire demand calculations for regional trade areas on either side.

The system further may (step 602) aggregate tire demand characteristics at the repository level with respect to each of the associated dealer (local) trade areas. The resulting aggregated data for each of a plurality of tire sizes may then be used for example (step 603) to generate a demand curve for the respective repository corresponding to an optimal tier offering for each of the tire sizes (see, e.g., curve 801 in FIG. 8).

In various embodiments, the system may (step 604) characterize tire sizes along the demand curve as being desirable or undesirable for further allocation anywhere. For example, fast moving tire sizes (or underlying brands relating to a particular size) may be identified as desirable for maintaining in inventory at a local level, whereas other tire sizes may be identified as recommended but for inventory at a regional level, and still other tire sizes may be identified as "dead" due to their lack of projected future sales.

Figure 8:
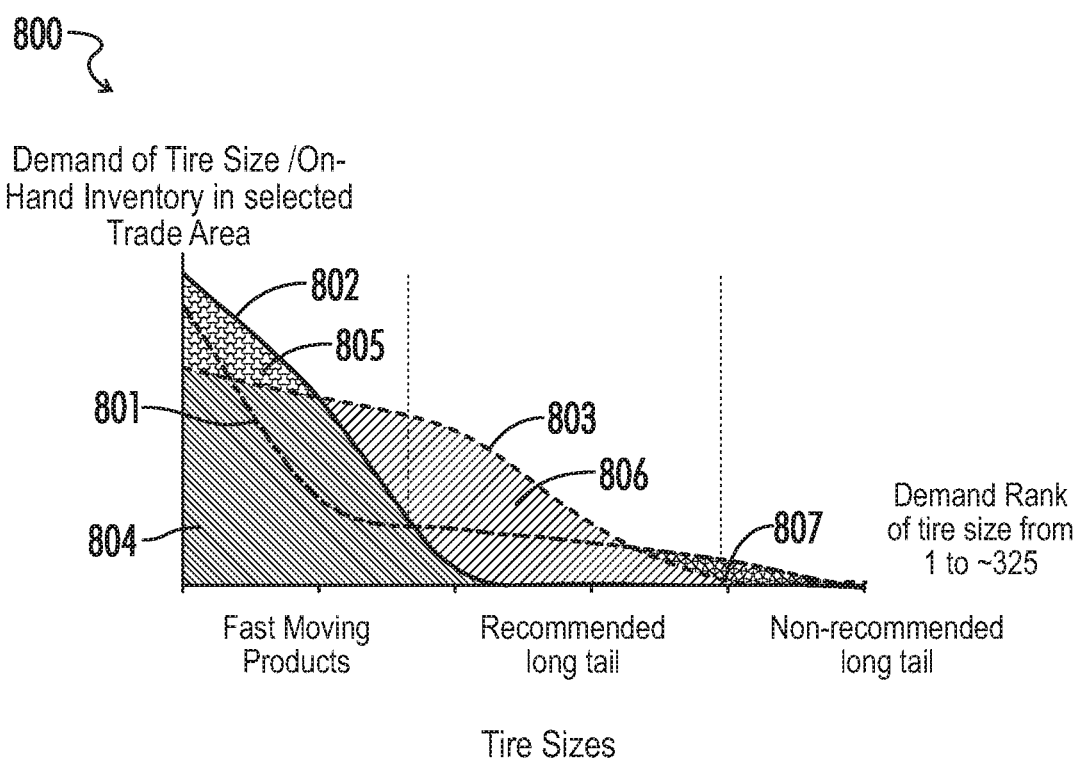
FIG. 8 is a graphical representation of an exemplary demand curve as generated by a system as disclosed herein with respect to actual tire inventories for a tire dealer or tire repository.

The system may (step 605) further determine value propositions at the repository level with respect to future allocation or reallocation of inventory between the repository and the associated dealers. For example, again with reference to an example as shown in FIG. 8, an actual inventory curve for a repository 803 may be compared against a demand curve for the associated regional trade area 801. It may generally be noted that at the high-demand portion of the actual inventory curve, the exemplary repository has fewer tire sizes in inventory than are projected by the demand curve, but that the exemplary repository has a large number of tire sizes in stock extending to the right along the graph which well exceed the system calculations for that regional trade area. For some of these tire sizes (i.e., shaded area 804), the system identifies fast moving products for reallocation or at least increased future allocation to the local dealer inventory and to the repository. For others (i.e., shaded area 806), the system may identify reasonably moving products for which lower future allocation of these tire sizes is recommended for the local dealer inventory. For others (i.e., shaded area 807), the system may identify tire sizes and SKUs with low demand and a slow turn rate, and recommend that such products are not carried in inventory at the dealer level, but rather are reallocated to the regional hubs as having relatively higher demand and sufficient inventory space. Orders for the "slow movers" can subsequently be redirected, handled and served by the regional repositories with fulfillment on demand directly to dealer locations.

In certain embodiments, the system may (step 606) in the longer term further leverage reallocation results for a footprint optimization model. For example, after a number of iterations or cycles with respect to the aforementioned operations, the system may determine declining trends in certain tire sizes or brands that may factor into subsequent calculations whereas the raw numbers alone would dictate continued inventory presence. The alternative may be stated for the example of growing markets, where the system may reallocate certain tire sizes or even modify regional trade areas to better capitalize on favorable demographic or commercial shifts.

In certain embodiments, methods and processes as disclosed herein may be separately or even independently executed with respect to tire dealers and/or tire repositories. For example, tire inventory decision support processing, optimization, analytics and reporting may be carried out for an individual tire dealer irrespective of neighboring or associated dealers, or may alternatively be performed for a first dealer while taking into account data points collected with respect to neighboring or associated dealers.

In other embodiments, methods and processes as disclosed herein may integrate decision support functions at tiers for each of dealers and repositories. For example, a first level of processing may project optimal tire inventories for each of a plurality of dealers associated with a repository, and a second level of processing may build on the projected local inventories by projecting an optimal tire inventory for the repository itself, whereas feedback loops are built into the process to account for actual allocation or reallocation over time with respect to the actual respective inventories. In other words, a projected optimal tire inventory for a repository may vary over time from an initial optimal tire inventory based on feedback from the associated tire dealers, wherein actual tire inventories at a local level are persistently higher than projected with respect to certain aspects, tire sizes, brands, unit sales or the like. One of skill in the art may appreciate that such practical variance over time may further be based on changes from the initial model with respect to demographics, logistics, new tire brands, cost shifts and the like.

In other embodiments, methods and processes as disclosed herein may integrate decision support functions across an entire network of dealers and repositories, at each functional tier. For example, in addition to a first level of processing at each dealer level, and a second level of processing for each repository, additional feedback loops and levels of processing may be built into the process (e.g., at a central server level) to account for actual allocation or reallocation over time with respect to the actual respective inventories for the repositories, wherein an effective centralized footprint optimization model for a cross-regional or national network may account for structural or persistent variance over time between the projected optimal tire inventories for repositories with respect to their actual tire inventories. Such embodiments may desirably enable centralized, national entities to distribute products such as tires directly to regional hubs and even in many cases to the dealers themselves before they are needed to fulfill a current order. Such embodiments may effectively eliminate or minimize channel conflicts (and arguably the need for intermediate distribution centers), thereby reducing complexity in inventory management and improving fulfillment processes.

In various embodiments, a central server as disclosed herein may coordinate among one or more regional hubs and tire dealers associated with a common entity. In alternative embodiments, a hosted server as disclosed herein may be associated with a third party host and further coordinate among one or more regional hubs and tire dealers associated with different parent entities. In such embodiments, a system as disclosed herein may construct a virtual tire inventory network corresponding to an aggregated optimal tire inventory for each of the plurality of different entities and their associated regional hubs and tire dealers, for comparison for example with underlying aggregated demand characteristics in various local trade areas or regional trade areas.

Figure 9:
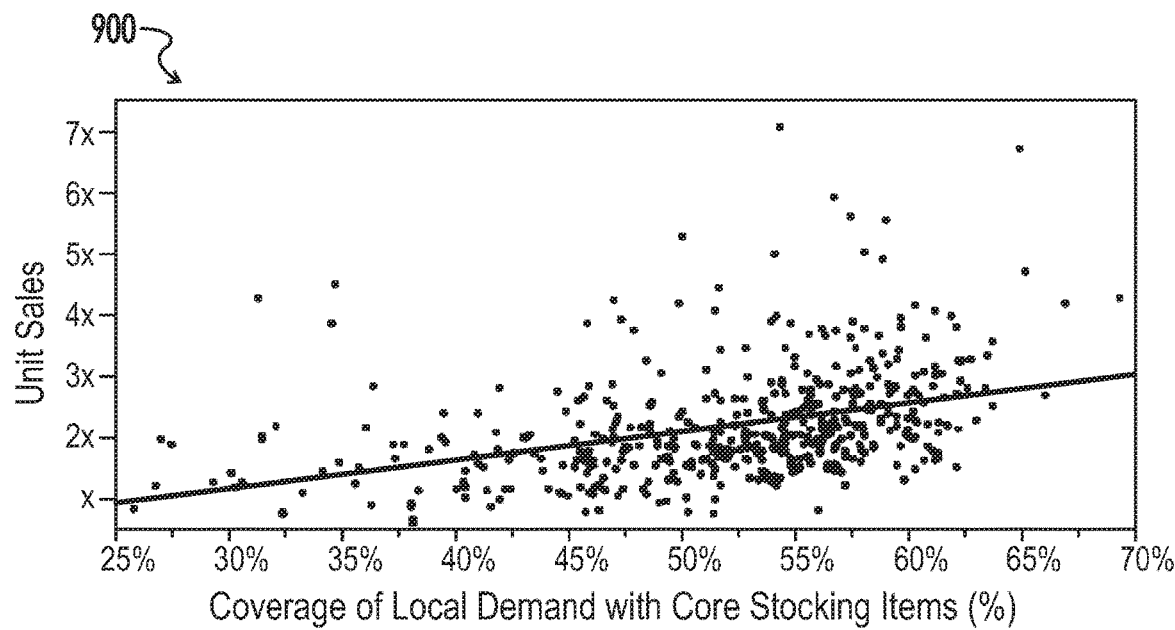
FIG. 9 is a graphical representation of an exemplary curve illustrating a number of unit sales by a tire dealer, with respect to a percentage of available inventory corresponding to demand-based optimal inventory as disclosed herein.
Figure 10:
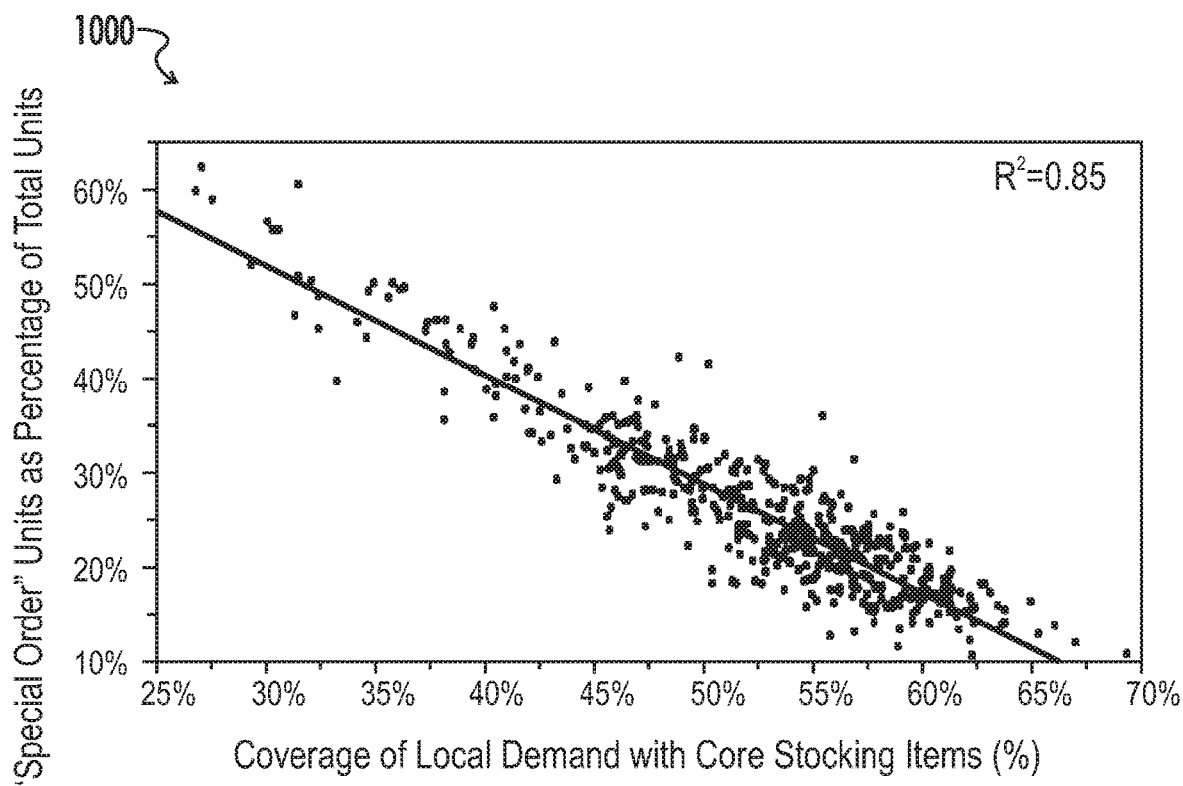
FIG. 10 is a graphical representation of an exemplary curve illustrating a number of special orders by a tire dealer as a percentage of total unit sales, with respect to a percentage of available inventory corresponding to demand-based optimal inventory as disclosed herein.

Systems and methods according to the present invention may generally optimize or at least improve tire dealer inventory portfolios, resulting in more direct unit sales and fewer special orders. The graph as shown in FIG. 9 demonstrates an exemplary positive correlation between a tire dealer's unit sales and a percentage of core tire inventory which covers optimal tire inventory as determined according to the present invention. In other words, stores which more closely match an optimal inventory based on local demand characteristics tend to have higher unit sales. The graph as shown in FIG. 10 further demonstrates an exemplary negative correlation between a tire dealer's unit sales as "special orders" and the percentage of core tire inventory which covers demand-based optimal tire inventory as determined according to the present invention. In other words, the better the point of sale inventory matches the determined local demand, the less special orders are required.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "user interface" as used herein may unless otherwise stated include any input-output module with respect to the hosted server including but not limited to web portals, such as individual web pages or those collectively defining a hosted website, mobile device applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present invention.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A computer-implemented method for predictive allocation of tire inventory across a network having a first distribution layer comprising one or more regional tire repositories and a second distribution layer comprising a plurality of tire dealers respectively associated with at least one of the one or more tire repositories, the method comprising:
- for each of the tire dealers in the network, defining, by a central server, a respective trade area having demographic tire demand characteristics and further corresponding to an available inventory capacity;
- aggregating, by the central server, demand characteristics for each of the respectively associated tire dealers to generate regional demand characteristics corresponding to each of the one or more tire repositories;
- for each of the tire repositories and tire dealers in the network, projecting, by the central server, an optimal inventory population for each of a plurality of tire sizes and brands, at least in part by:
  - generating a demand curve based on forecast future sales in the respective trade area or region over a time with respect to each of a plurality of tire sizes and brands;
  - characterizing each of the plurality of tire sizes and brands along the demand curve in accordance with a first tier of products having priority of allocation for local tire dealers, a second tier of products having priority of allocation for regional tire repositories, or a third tier of products lacking priority of allocation in either of the tire dealers or the tire repositories; and
  - determining a subset of the plurality of tire sizes and brands as the optimal inventory population based at least in part on the respectively characterized tiers and an available inventory capacity for the respective tire repository or tire dealer,
  - wherein the characterization for a tire size and brand varies among the plurality of tire dealers based at least in part on an amount of time required for fulfillment of a custom order to a respective tire dealer from the associated one or more tire repositories,
  - wherein the optimal inventory population for each of the one or more tire repositories is further based at least in part on an aggregated optimal inventory population from each of the associated tire dealers;
- for each of the tire repositories and tire dealers in the network, receiving, by the central server, feedback information therefrom corresponding to an actual inventory population for each of the plurality of tire sizes and brands;
- developing, by the central server, a centralized footprint optimization model accounting for persistent variance over time between the projected optimal inventory populations with respect to the actual inventory populations for each of the tire repositories and tire dealers in the network;
- directing, by the central server, distribution and/or reallocation of actual inventory for each of the plurality of tire sizes and brands among the tire repositories and tire dealers in the network, based at least in part on the footprint optimization model;
- generating, by the central server, a graphical user interface for display on a computing device for one or more of the tire repositories and/or tire dealers, displaying recommendations for tire inventory modification in a visual data array comprising rows and columns, based on disparities between the optimal inventory population and the actual inventory population;
- visually highlighting, in the graphical user interface, one or more rows and/or columns of the visual data array corresponding to one or more specific tire sizes or brands presenting a value proposition based on a difference between the optimal inventory population and the actual inventory population exceeding a predetermined threshold deviation level; and
- streaming, by the computing device, from the central server, the graphical user interface to display the recommendations for tire modification in the visual data array with the visually highlighted rows and/or columns thereof on the computing device.

2. The method of claim 1, wherein the step of defining a trade area is further characterized by analyzing data points selected from a group comprising: a distance that associated customers are willing to drive; a time that associated customers are willing to drive; road conditions and speed limits in the area; location of the tire dealer respective to retail centers in the trade area; population density; household income; age and value of vehicles in the trade area; competitor density and proximity.

3. The method of claim 1, wherein:
the optimal inventory population for each tire dealer is projected for each of the plurality of tire sizes and brands, based at least in part on the available inventory population for the tire dealer and an actual inventory population for the associated tire repository.

4. The method of claim 3, further comprising projecting an optimal inventory population for each tire repository with respect to each of a plurality of tire sizes and brands, based on the tire demand characteristics for the associated tire dealers.

5. The method of claim 4, further comprising modifying projected tire inventory replenishment for each tire repository based on the projected optimal inventory population for the respective tire repository and an aggregate actual tire inventory for each of the respectively associated tire dealers.

6. The method of claim 1, further comprising redefining one or more trade areas based on feedback data corresponding to observed trends in demographic tire demand characteristics.

7. The method of claim 1, further comprising modifying previous associations between one or more of the tire repositories and a plurality of tire dealers based on feedback data corresponding to observed trends in demographic tire demand characteristics.

8. A system comprising:
a central server linked to a network of computing devices across a communications network, each computing device associated with at least one of a plurality of tire dealers and tire repositories, wherein a first and regional distribution layer comprises the plurality of tire repositories and a second and local distribution layer comprises the plurality of tire dealers, each tire dealer associated with a tire repository which is further associated with one or more other of the plurality of tire dealers;
wherein the central server is configured to selectively direct the performance of operations comprising:
  for each of the plurality of tire dealers, defining a respective trade area having demographic tire demand characteristics and further corresponding to an available inventory capacity,
  aggregating demand characteristics for each of the respectively associated tire dealers to generate regional demand characteristics corresponding to each of the tire repositories;

for each of the tire repositories and tire dealers in the network, projecting an optimal inventory population for each of a plurality of tire sizes and brands, based at least in part on:
  generating a demand curve based on forecast future sales in the respective trade area or region over a time with respect to each of a plurality of tire sizes and brands;
  characterizing each of the plurality of tire sizes and brands along the demand curve in accordance with a first tier of products having priority of allocation for local tire dealers, a second tier of products having priority of allocation for regional tire repositories, or a third tier of products lacking priority of allocation in either of the tire dealers or the tire repositories; and
  determining a subset of the plurality of tire sizes and brands as the optimal inventory population based at least in part on the respectively characterized tiers and an available inventory capacity for the respective tire repository or tire dealer,
  wherein the characterization for a tire size and brand varies among the plurality of tire dealers based at least in part on an amount of time required for fulfillment of a custom order to a respective tire dealer from the associated one or more tire repositories,
  wherein the optimal inventory population for each of the one or more tire repositories is further based at least in part on an aggregated optimal inventory population from each of the associated tire dealers;
for each of the tire repositories and tire dealers in the network, receiving feedback information therefrom corresponding to an actual inventory population for each of the plurality of tire sizes and brands,
developing a centralized footprint optimization model accounting for variance over time between the projected optimal inventory populations with respect to the actual inventory populations for each of the tire repositories and tire dealers in the network, and
directing distribution and/or reallocation of actual inventory for each of the plurality of tire sizes and brands among the tire repositories and tire dealers in the network, based at least in part on the footprint optimization model;

generating a graphical user interface for display on the network of computing devices for one or more of the tire repositories and/or tire dealers, displaying recommendations for tire inventory modification in a visual data array having rows and columns, based on disparities between the optimal inventory population and the actual inventory population;

visually highlighting, in the graphical user interface, one or more rows and/or columns of the visual data array corresponding to one or more specific tire sizes or brands presenting a value proposition based on a difference between the optimal inventory population and the actual inventory population exceeding a predetermined threshold deviation level; and wherein a computing device of the network of computing devices is configured to perform an operation comprising:
  streaming, from the central server, the graphical user interface to display the recommendations for tire modification in the visual data array with the visually highlighted one or more rows and/or columns of the visual data array on the computing device.

9. The system of claim 8, wherein the central server is configured to generate a customer interface displayable on a customer device communicatively linked to the server via the communications network,
  said customer interface enabling presentation and selection of tires that are available for purchase from at least one of the tire dealers, either with respect to actual inventory of the at least one tire dealer or as available for fulfillment with respect to the associated tire repository within a fulfillment time corresponding to requirements of the customer.

10. The system of claim 8, wherein the server is further configured to redefine one or more trade areas based on feedback data corresponding to observed trends in demographic tire demand characteristics.

11. The system of claim 8, wherein the server is further configured to modify previous associations between one or more of the tire repositories and a plurality of tire dealers based on feedback data corresponding to observed trends in demographic tire demand characteristics.

* * * * *